United States Patent [19]

Barbier et al.

[11] Patent Number: 5,455,586
[45] Date of Patent: Oct. 3, 1995

[54] PULSE RECOGNITION METHOD AND DEVICE, AND USE THEREOF FOR THE FILTERING OF THE S MODE RESPONSES OF A SECONDARY RADAR

[75] Inventors: Daniel Barbier, Rouen; Philippe Billaud, Fontenay Aux Roses; Claude De Volder, Auffargis; Jean-Paul Parissenti, Montigny Le Bretonneux, all of France

[73] Assignee: Thomson-CSF, Puteaux, France

[21] Appl. No.: 85,209

[22] Filed: Jun. 29, 1993

[30] Foreign Application Priority Data

Jun. 30, 1992 [FR] France ................ 92 08026

[51] Int. Cl.6 .................................................. G01S 13/76
[52] U.S. Cl. .................. 342/37; 342/40; 342/46; 342/197
[58] Field of Search ................ 342/37, 40, 32, 342/46, 50, 197

[56] References Cited

U.S. PATENT DOCUMENTS

| | | | |
|---|---|---|---|
| 4,945,550 | 7/1990 | Krause et al. | 375/94 |
| 5,063,386 | 11/1991 | Bourdeau et al. | 342/40 |
| 5,073,779 | 12/1991 | Skogmo et al. | 342/37 |
| 5,077,673 | 12/1991 | Brodegard et al. | 342/29 X |
| 5,089,822 | 2/1992 | Abaunza et al. | 342/30 |
| 5,157,615 | 10/1992 | Brodegard et al. | 342/30 X |
| 5,317,317 | 5/1994 | Billaud et al. | 342/40 |
| 5,341,139 | 8/1994 | Billaud et al. | 342/40 |
| 5,341,142 | 8/1994 | Reis et al. | 342/64 |

FOREIGN PATENT DOCUMENTS

| | | |
|---|---|---|
| 0055151 | 6/1982 | European Pat. Off. . |
| 2728100 | 2/1980 | Germany . |

OTHER PUBLICATIONS

Trim, R. M., "Mode S: an introduction and overview", Electronics & Communication Engineering Journal, vol. 2, No. 2, Apr. 1990, London, pp. 53–59.

Primary Examiner—John B. Sotomayor
Attorney, Agent, or Firm—Meltzer, Lippe, Goldstein et al.

[57] ABSTRACT

Disclosed are a device for the detection of S mode responses received by a secondary radar receiver and its use for the filtering of the pulses contained in this response. The device furthermore comprises means to detect a signal S, means for the real-time computation of the mean values of magnitudes characterizing the pulses that belong to the response, and means for the filtration, by comparison, of the values of the magnitudes measured on each pulse detected with the mean value of the corresponding magnitude.

16 Claims, 7 Drawing Sheets

PULSE RECOGNITION METHOD AND DEVICE, AND USE THEREOF FOR THE FILTERING OF THE S MODE RESPONSES OF A SECONDARY RADAR

BACKGROUND OF THE INVENTION

The present invention relates to the filtering of the responses received by a secondary radar receiver.

It is known that a radar can be fitted out with a device called a secondary radar used to obtain, from cooperating carrier vehicles equipped with radar responders, coded information elements on the identity of the carrier and other coded information elements (pertaining to altitude, reporting of radio malfunctions, distress signals etc).

The transponders of the carrier vehicles emit responses whenever they are interrogated and, sometimes, they do so spontaneously in a mode of operation with selective addressing, called S mode operation, that can be used also for anticollision functions. Each radar fitted out with a secondary radar must therefore be provided with means enabling it to recognize those responses, among all the responses received, that are S mode responses so as to be able to eliminate them in order to keep only the responses in the other modes and achieve easier sorting out the responses to its own interrogations in these other modes. As standardized by the International Civil Aviation Organization (ICAO), a response in S mode is constituted by a train of pulses emitted at a carrier frequency of 1090 MHz.

Each train of pulses has a preamble and a message.

The preamble has four identical pulses with a duration of 0.5 μs each. The first two pulses and the last two pulses are separated from each other by 0.5 μs. The first pulse and the third pulse are separated from each other by 3.5 μs.

The message or data block may be short or long. When it is short, the message has 56 pulses of 0.5 μs each and, when it is long, it has 112. The modulation of the message is done by the position of the pulses which may be at the start or at the end of 1 μs intervals.

The first of these intervals is 8 μs behind the first pulse of the preamble.

The definition of the standard is shown schematically in FIG. 1. This figure also shows the tolerances as defined by the ICAO.

The need to filter the S mode responses has not yet arisen since interrogation with selective addressing is not operational to date. However, invitations of tenders for secondary radar response extractors are already stipulating a requirement of protection against the S mode responses for these responses are such as to induce numerous false detections of secondary responses which may saturate the extractor.

The known circuits carry out:

a detection of the S mode responses on the presence of the four pulses of the preamble;

an elimination of all the pulses received during a period of time longer than that of a long S response.

This principle of detection is subject to a high rate of false alarms in the presence of "garbled" secondary responses and does not specify the length of the S mode response detected (64 μs or 120 μs). A response is said to be "garbled" when it is mixed with other responses to the point where one or more pulses of the response have apparent lengths that are different from their real lengths, owing to the overlapping of the pulses of the different responses. The "all or nothing" method of filtering notably reduces the probability of detection of the secondary responses for the elimination is not selective.

The present invention improves the detection of the secondary responses, reduces the number of false responses detected and prevents the saturation of the extractor when there are responses coming from a transponder with selective addressing (mode S).

It enables the search for and the selective elimination of the pulses belonging to an S mode response and hence the preserving of the secondary radar responses received during the period of the S mode response. The invention therefore relates, firstly, to a method and device for the detection of the S mode responses, capable of indicating the type of response (short or long), and secondly a method and a device to eliminate the pulses belonging to the S mode response. If the second device is to fulfil its role of eliminating the pulses of an S mode response while at the same time keeping the secondary radar response pulses, the search should be made under conditions where all the information received is saved. The invention is applicable whenever the pulses of a message having the characteristics of an S type response have to be sorted out.

It is located downline with respect to a device for the digitization of received video signals and a device for the detection of the leading edges of the pulses.

The devices that elaborate the different video signals are known per se and shall not be described. These are notably, as far as the invention is concerned, a signal that is conventionally called LogΣ and represents the power of the received signal and a signal that is conventionally called _/Σ and represents the angular divergence between the point of origin of the received signal and the axis of a directional antenna with which the receiver is equipped.

A search is made for the presence, if any, of an S mode response at the end of each of the elementary time periods determined by a clock. In the preferred embodiment, this period referenced P is the same as the sampling period used for the digitization of the video signals. The detection method according to the invention is used to determine whether the detected S mode response is a short S mode response (duration of 64 μs) or a long S mode response (duration of 120 μs).

To this end, the pulse leading edges are memorized in a register with series input and parallel outputs. The information contained in the register is shifted at the sampling rate. The register has a number of compartments greater than the number obtained through the division of the duration of a short S mode response by the sampling period P. Preferably, the number of compartments is such that it enables the memorizing of the pulse leading edge No. (56+c) of a long S mode response (c>0) while the first pulse of the preamble of this response is still present in the register. The parallel outputs of the register are connected to two correlators formed in a standard way by AND gates.

The correlation is aimed at ascertaining the simultaneous presence of the leading edges of the four pulses of the preamble, the b last pulses of an S mode response that is short and the c first pulses of a S mode response that is long. At output of the correlators, therefore, there is an information element relating to the presence of an S mode response and to its length. It is therefore possible to adapt the following part of the processing of the response thus detected, especially its filtering, to the length of the response. According to one embodiment of the invention, the filtering, namely the elimination of the pulses of the S mode responses so as to process only the other responses of the secondary radars, is done by considering not only the temporal position of each of the pulses with respect to the pulses of the preamble but also its level of power determined by the value of the signal Log$\Sigma$ and its angular divergence determined by the value of the signal $\Delta/\Sigma$.

Normally, all the pulses that belong to a single response are at the same power level and have a same value of angular divergence.

It is therefore probable that a pulse that is well positioned in time but has a power level or value of angular divergence that is different from the mean of the other pulses of the response will be a pulse belonging to another response.

To establish the mean power of the S mode response, different principles ranging from the simplest to the most sophisticated may be used. These include:

the use of the pulses of the preamble only;

the use of the detected S mode pulses correlating with the established reference on the pulses of the preamble;

the application of the principle described by the French patent application No. 89 14416: *Elaboration de la puissance d'une reponse mode S par analyse de l'histogrammme des valeurs des impulsions possible pendant la durée d'une reponse mode S* (the corresponding U.S. Pat. No. 5,063,836, "Device For The Detection Of The Signals Of Transponders Interrogated By A Secondary Radar In The Presence Of Multiple-Path Phenomena" has been delivered on 5th Nov. 1991).

The power of each of the pulses, well positioned in time and thus capable of constituting a part of the S mode response, is compared with the mean power level of the pulses set up beforehand. If the difference power between the examined pulse and the mean level is below a previously fixed threshold, then the pulse is considered to form part of the S mode response. The value of the threshold can be adapted to take account of the mean value established. The weaker the response, the more it is subject to major variations owing to the increasing effect of the noise. It would therefore be advisable to raise the value of the comparison threshold for the low mean power values. This adjustment of the threshold could be done by successive stages.

To establish the mean value of the angular divergence, it is the mean value of angular divergence of the pulses of the preamble that is used.

Here again, there is a choice. The mean value of the angular divergence could be established by any other known method, especially by the method of the histogram described in the French patent application No. 89.14416 applied to the magnitude of angular divergence.

The value of the angular divergence of each pulse which, by virtue of its temporal position, is liable to belong to the S mode response, is compared with the mean value established on the first four pulses. If the difference between the angular divergence of the examined pulse and the mean angular divergence is below a previously fixed threshold, then the pulse is considered to form part of the S mode response.

The decision to reject a pulse may be taken solely as a function of the results of the comparison on LOG$\Sigma$ or $\Delta/\Sigma$. It can also be done cumulatively on both criteria, and in this case, it may be chosen only if it meets both criteria. In the embodiment that shall be described further below, the two criteria are used cumulatively, except when the level of Log$\Sigma$ becomes lower than a fixed threshold, in which case only Log$\Sigma$ is used.

SUMMARY OF THE INVENTION

The invention pertains to a digital method for the real-time detection of pulse messages constituted according to a standard defining the widths and relative positions of the different pulses constituting the message, the standard stipulating that the message may be short, in which case it comprises a number (A+B) of pulses, or long in which case it comprises (A+B+C) pulses, wherein:

1) signals representing the presence or absence of a pulse leading edge are memorized in sequence at intervals corresponding to a period P, for a number of periods P that is sufficient to memorize at least (A+B+1) pulses of the message, each leading edge having, at each instant, an address in the memory as a function of its instant of arrival;

2) a check is made to verify the simultaneous presence of a first group of pulses which, by virtue of the relative time differences of their addresses, are liable to belong to the (A+B) first pulses memorized, this simultaneous presence leading to the production of a first signal having the value (1) in the event of presence and the value (0) in the event of absence and simultaneously a check is made to verify the simultaneous presence of a second group of pulses which, by virtue of the relative time differences of their addresses, are liable to belong to pulses of the message, memorized after the (A+B) first pulses, this presence leading to the production of a second signal having the value (1) in the event of presence and the value (0) in the event of absence, the first signal at (1) constituting a message detection, the second signal at (0) or (1) characterizing a short or long message.

It also pertains to a device that enables the method to be carried out, i.e. a device for the real-time detection of the pulses belonging to a microwave message constituted according to a standard stipulating that the message may be randomly short or long, and that comprises:

a preamble constituted by a number A of pulses, for which the widths and relative positions as well as the tolerances of divergence are fixed by the standard;

a block of data elements constituted by pulses modulated in position, for which the widths and the possible positions, given the modulation and the tolerances, are fixed by the standard, the standard stipulating that each block of data elements may be randomly constituted by B pulses, in which case the message is said to be short, or (B+C) pulses in which case the message is said to be long, the device being included in a receiver of microwave signals provided with means to elaborate a digital signal called LE representing the presence of a pulse leading edge, means to elaborate other magnitudes relating to the microwave signals received by the receiver, and means to convert these magnitudes into digital signals, the digitization being done by a periodic sampling of values of these magnitudes, wherein the sampling is controlled by clock signals simultaneously for the signals LE and for the other magnitudes, the period having the value P, and wherein the signals at output of the means preparing the signals LE are introduced in sequence, upon command by the same clock signals, into a shift register with series input and parallel outputs, comprising a number of compartments that is not smaller than the number of periods P between the leading edge of the first pulse of the preamble and the leading edge of the first pulse of the C pulses characterizing a long response and wherein first groups of outputs of consecutive compartments of this register are connected in parallel to supply series links which supply a first correlator, second groups of outputs of consecutive compartments of this register are connected in parallel to supply series links which themselves supply summators, each summator output supplying the first correlator, and wherein third groups of outputs of consecutive compartments of this register are connected in parallel to supply series links which themselves supply summators, each summator output supplying a second correlator, and wherein the first and second correlators each deliver a positive signal only upon the presence of a signal at each of their supplies.

It also pertains to a digital method for the recognition of pulses liable, by virtue of their temporal positions, to belong to a pulse message constituted according to a standard that defines the widths and relative positions of the different pulses constituting the message, the standard stipulating that the message may be short, in which case it comprises (A+B) pulses, or long in which case it comprises (A+B+C) pulses, said method consisting in:

a) memorizing, in sequence at intervals corresponding to a period P, for at least one of magnitudes $\alpha$, $\beta$, o, values measured beforehand on each pulse, each value having, at each instant, an address in the memory as a function of its instant of arrival;

b) detecting, in sequence at the same instants and at intervals corresponding to the same period P, the presence of a message, the detection being made so as to occur, by construction, in a time that is known in relation to the first pulse of the detected message, each detection prompting the passing to 1 of a first signal initially at 0 and the passing to 1 of a second signal, initially at 0, if the response is long;

c) upon the receiving of a value 1 for the first signal and of the value of the second signal, the establishing on several values of the magnitudes $\alpha$, $\beta$, $\gamma$ respectively, stored in memories which, by virtue of their addresses, have relative positions corresponding to pulses of the message detected at the step b, of mean reference values $\overline{\alpha}$, $\overline{\beta}$, $\overline{\gamma}$ of the different magnitudes;

d) determining the address of the value of at least one of the magnitudes $\alpha$, $\beta$, $\gamma$ which, by virtue of its position with respect to the moment of the detection, is the address of the value $\alpha$, $\beta$, $\gamma$ of the first pulse;

e) comparing the value of at least one magnitude $\alpha$ or $\beta$ or $\gamma$ with the corresponding mean value $\overline{\alpha}$ or $\overline{\beta}$ or $\overline{\gamma}$;

f) recognizing the first pulse as belonging to the message if none of the comparisons shows a divergence, between its value and the corresponding mean reference value, that is greater than a previously fixed threshold for each magnitude;

g) recommencing the steps d, e, f for each of the following pulses which, by virtue of their positions, are liable to belong to the detected response, during the time corresponding to a short message if the second signal has the value 0 and the time corresponding to a long message if the second signal has the value 1.

Finally, it relates to a filtering device designed for the application to the above method, i.e. to a device for the real-time recognition of the pulses belonging to a microwave message that is constituted according to a standard stipulating that the message may be randomly short or long and that comprises a preamble constituted by a number A of pulses, for which the widths and relative positions as well as their divergence tolerances are fixed by the standard, a block of data elements constituted by pulses modulated in position, for which the widths and the possible positions, given the modulation and the tolerances, are fixed by the standard, the standard stipulating that each block of data elements may be randomly constituted by B pulses, in which case the message is said to be short, or (B+C) pulses in which case the message is said to be long, the device being included in a receiver of microwave signals provided with means to elaborate a digital signal called a pulse message, this message being established on the basis of digital samples, taken at intervals corresponding to a period P, of magnitudes $\alpha$, $\beta$, $\gamma$ characterizing the video signals received by the receiver, the pulse message comprising an information element pertaining to the detection of a pulse leading edge, called LE, information elements called "sum", representing the sum of the values of the samples of each magnitude $\alpha$, $\beta$, $\gamma$, assigned to the pulse represented by the leading edge LE, an information element called "numsam" relating to the number of samples of each magnitude assigned to the pulse represented by the leading edge LE, wherein the device has means to detect the arrival of the message, said means receiving, in sequence, the information elements LE and delivering a signal MSR if a message is detected and a signal LMSR if the detected message is long, a means to compute the mean value $\overline{sum}$ of each magnitude sum, this means receiving the magnitudes sum and the magnitude numsam of the pulse message, a first addressable circular storage memory, a second addressable circular storage memory called a working memory, each receiving, in sequence, the values of the magnitudes sum, the address of each magnitude being, at each instant, a function of its instant of arrival in the memory, a means for computing memory addresses and sequencing, which on receiving the signals MSR and LMSR, determines sum value addresses of at least one magnitude $\alpha$, $\beta$, $\gamma$, the selected values being supplied in sequence, from the working memory, to a means for the computing of a mean value sum of each selected magnitude, this computing means itself supplying a first series of inputs of a comparison element which, at a second series of inputs and in sequence, receives, from the storage memory and after the end of computation of the mean reference values $\overline{sum}$, each of the values of the selected magnitudes $\alpha$, $\beta$, $\gamma$ which, by virtue of their addresses, are liable to belong to the detected response, the comparator holding back, as a pulse belonging to the detected response, the pulses for which the the difference between a value of magnitude measured on this pulse and the mean reference value is below a predetermined threshold for each of the selected magnitudes.

In the application according to the invention, the standard is the standard defining the S mode responses. In this application, A=4, B=56 and C=56. The first group of consecutive outputs of the compartments of the register is constituted by compartments corresponding to the position that may be occupied by the pulses of the preamble. The second group corresponds to pulses belonging to the B pulses contained by the message of a short S mode response, the third group of consecutive outputs of the register corresponds to pulses belonging to the C pulses of a long S mode response. An output with a value 1 at the first correlator characterizes a detection of an S mode response by the presence, at the instants defined by the standard, of pulses of the preamble and pulses of the first part of the message corresponding to the B pulses of a short response. An output with a value 0 at the output of this first correlator corresponds to an absence of detection. When the output of the first correlator is at 1 and the output of the second correlator is at 0, then the detected response is short. It is long if the output of the second correlator is also at 1.

In the preferred embodiment of the invention, the second group of outputs is constituted by the possible positions of the last three pulses of a short S mode response, the third group is constituted by the first three pulses of the C pulses characterizing a long S mode response. It has indeed been observed, by simulation, that a detection on three additional pulses of a short S mode response considerably diminishes the probability of false detection. The choice of the first three pulses of the group of C pulses corresponds to the imperative requirement of detecting that the response is long as early as possible, so that the processing of these responses can be started as early as possible.

BRIEF DESCRIPTION OF THE DRAWINGS

The invention shall now be described with reference to the appended drawings, of which.

MORE DETAILED DESCRIPTION

Figure 1A:
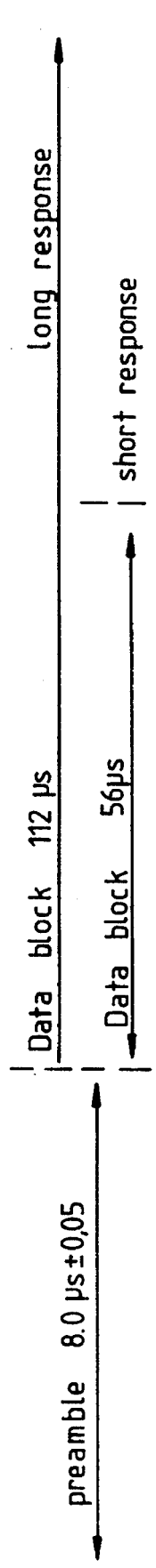
FIGS. 1a–1c illustrate the specifications defined by the ICAO for an S mode response.
Figure 1B:
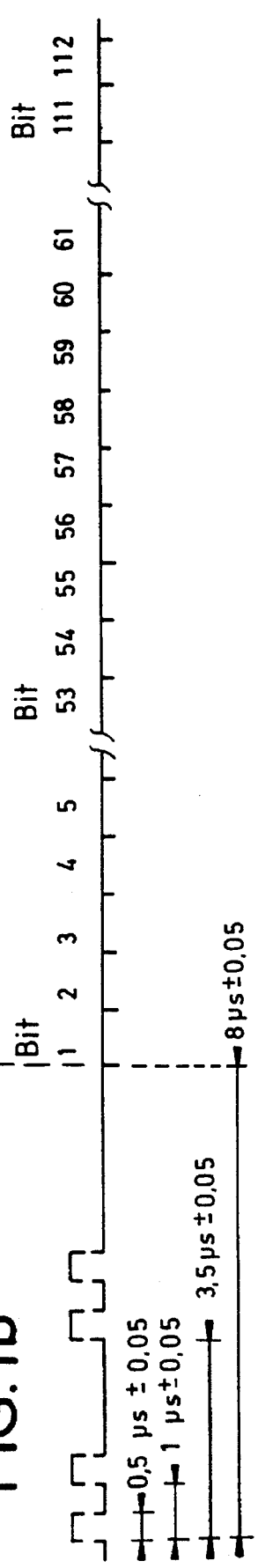
Figure 1C:
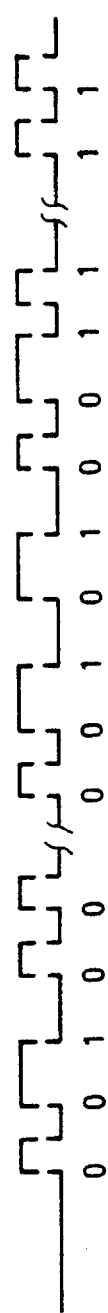

FIG. 1 illustrates the specifications defined by the ICAO for an S mode response. It is divided into three figures: FIGS. 1a, 1b and 1c.

FIG. 1a shows the general shape of an S mode response. It can be subdivided into a same preamble of 8 μs plus or minus 0.05 μs and a data block which may be either a short data block of 56 μs or a long data block of 112 μs.

FIG. 1b shows firstly the preamble and secondly the data bits of the response block. The preamble has four pulses, two first pulses and two second pulses. The two first pulses have a width of 0.5 μs±0.05 μs and they have a spacing, between them, of 0.5 μs. At 3.5 μs±0.05 μs from the first pulse of the first block of two pulses, there is a second block of two pulses identical to the previous one. At 8 μs from the leading edge of the first pulse of the first block, come the data bits of the data block. The number of these bits is 56 and 112, depending on whether the response is short or long.

FIG. 1c shows the mode of encoding of the data bits belonging to the response block. These data bits are constituted by pulses that are each located in an interval of 1 μs. Each pulse has a width of 0.5 μs. It is placed either at the head of the 1 μs interval or the end of this interval. If it is placed at the head, the pulse conventionally represents a one. If not it represents a zero. Thus, a pulse representing a zero followed by a pulse representing a one will be constituted by single 1 μs pulse while a pulse representing a one followed by a pulse representing a zero will mean that there is no signal for 1 μs.

In the embodiment according to the invention, it has been chosen to decide that the S mode response is present or absent by the detection, firstly, of the four pulses of the preamble and, secondly, the last three data pulses of a short S mode response. With regard to the long S mode responses, it has been chosen to detect the first three pulses that follow the 56th pulse, the 56th pulse being the last pulse of a short S mode response.

The positions that can be taken by the pulse leading edges are shown in FIG. 2: for the pulses 54 to 59, the leading edge of the pulse is represented by a signal, with a 50 ns duration, called LES.

Figures 2A, 2B:
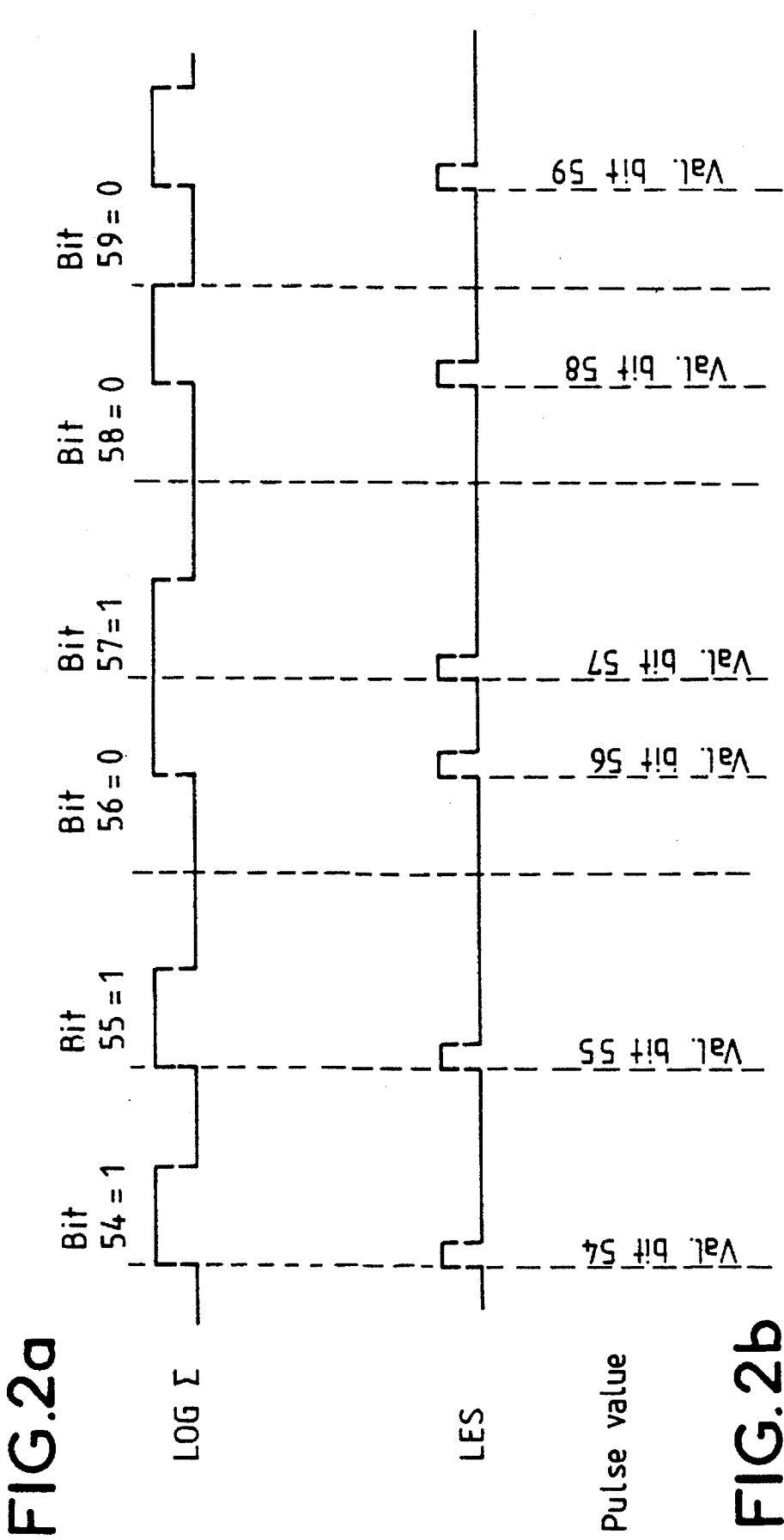
FIGS. 2a and 2b shows the positions that may be taken by the leading edge of a pulse of an S mode response belonging to the data block.

FIG. 2a shows an example of the response signal for the pulses 54 to 59 and FIG. 2b shows the position of the pulse leading edges of this signal. In FIG. 2a, the bits 54, 55, 57 have the value 1, i.e. the pulse representing the bit is at the head of an interval of 1 μs. The bits 56, 58, 59 are zeros, i.e. the pulse representing the bit is located at the end of an interval of one μs. The corresponding pulse leading edges are located at the head of the 1 μs interval for the bits 54, 55 and 57 and in the middle of this 1 μs interval for the bits 56, 58 and 59.

Figure 3:
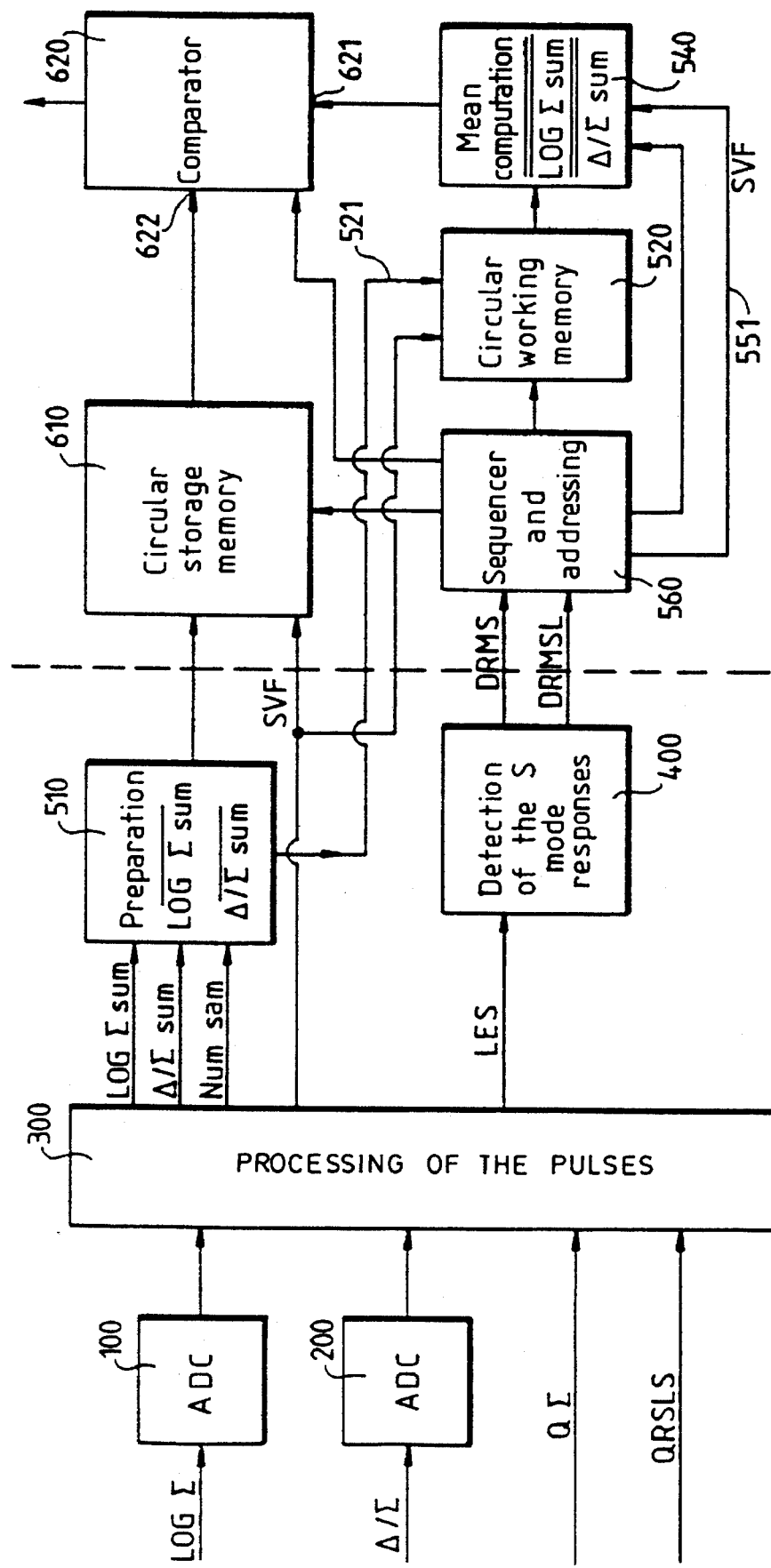
FIG. 3 shows the layout of the invention in a secondary radar extractor.

FIG. 3 shows the layout of the device of the invention in a secondary radar extractor. The device of invention is located downline with respect to circuits that are known per se and that prepare, in a standard way, an information element that is conventionally called LogΣ, representing the logarithm of the amplitude of the received signal, and an information element Δ/Σ representing the angular divergence between the radioelectrical axis of the radar antenna at the ground and the position of the aircraft in the lobe of the antenna, and a signal QΣ which is a copy of the LogΣ signal reduced by six decibels so as to obtain the midpoint of the value of the power of the pulse.

The preparing of the signals coming from the so-called sum and difference channels is known per se and is not shown in FIG. 3. FIG. 3 shows analog converters 100 and 200 which respectively receive the information elements LOGΣ and Δ/Σ.

The information elements thus digitized are introduced into a device 300 known as a pulse-processing device which also receives digitized information elements on QΣ and a signal QRSLS, called an indication of reception on secondary lobes. All these signals are known per se and shall not be described.

The device 300 does not form part of the present invention. Consequently, only the functions of this device needed to understand the working of the invention shall be described.

With regard to the working of the invention, the device 300 elaborates the position of the leading edges of the pulses. This preparing of the leading edge of the pulses is done not only by taking account of the position of the real leading edges appearing above a fixed detection threshold but also by taking account of all the significant variations of the detected power level. These variations may reveal pulse garblings. This device also takes account of the duration of the pulses, firstly to eliminate, in a standard way, all the pulses having a duration of less than 0.3 μs and, secondly, to generate, artificially, pulse leading edges called pseudo leading edges. These pseudo edges are prepared when the length of a real pulse makes it possible to assume that at least two response pulses have contributed to the creation of the received signal. Two types of pseudo edges are established, firstly S type edges assuming that the received pulse belongs to an S mode response and, secondly, ordinary response pseudo edges assuming that the received pulse belongs to an ordinary response. All the pulses detected as well as the pseudo pulses created are sent, firstly, to a device for the detection of the ordinary responses (not shown) and, secondly, to a device 400 for the detection of the S mode responses.

Figure 4:
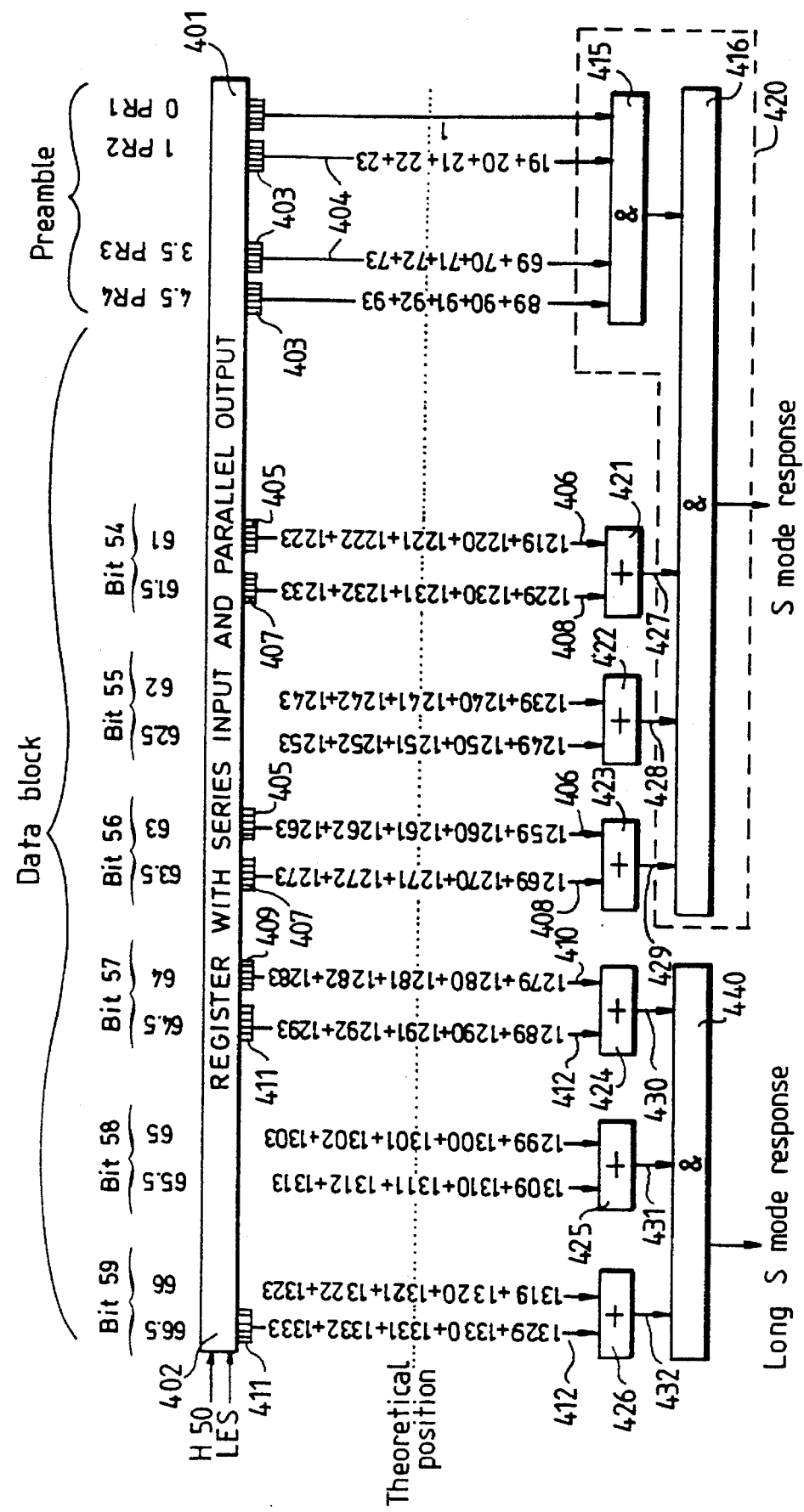
FIG. 4 shows the mode of detection of an S mode response.

The working of the detection device 400 shall now be explained with reference to FIG. 4. This detection is done at the same frequency as the sampling frequency used for the digitization of the information elements LogΣ and Δ/Σ by the analog-digital converters 100 and 200. In the case of the embodiment, this frequency is equal to 20 MHz. This frequency of 20 MHz is given by a clock (not shown). It is the signal of this clock that sequences not only the processing of the digital signals given at the output of the device 300, but also all the processings. In this way, a processing step is performed throughout the processing system whenever a new sample is taken. Thus, the detection of the S mode responses is done every 50 ns. Given the mode of detection chosen for the working of the device 400 and the configuration of an S mode response, the detection calls for the storage of all the pulse leading edges during a period of 66.7 μs. At the end of this period, it is possible to decide that, firstly, an S mode response has been received and, secondly, this response is long or short.

To carry out this detection, all the signals representing the presence or absence of the pulse leading edges are introduced at a pitch of 50 ns in a shift register 401 with series input 402 and parallel outputs; the register has 1333 compartments numbered 1 to 1333. Given the tolerances and the jitter related to the sampling at the pitch of 50 ns, it is assumed that if the first pulse of the preamble occupies the compartment 1, the second one located at a distance of 1 μs may occupy the compartments 19 to 23, the third one may occupy the compartments 69 to 73 and the fourth one may occupy the compartments 89 to 93. Each group 403 of corresponding parallel outputs is connected to a series link 404 which leads to a first set 415 of AND gates that enable the verifying of the simultaneous presence of four pulses spaced out as in an S mode response preamble.

To verify the presence of the last three pulses of a short S mode response, the groups of outputs 405, 407 of the compartments 1219 to 1223 and 1229 to 1233, 1239 to 1243 and 1249 to 1253, 1259 to 1263 and 1269 to 1273 are connected to series links 406, 408 which supply a second set of AND gates 416 receiving the output of the first set 415. A first correlator 420 constituted by the two sets 415 and 416 therefore makes it possible to ascertain that the four pulses of the preamble and the last three pulses of a short S mode response are present simultaneously. It is observed that, for the last three pulses of the response, owing to the modulation in position, three adders 421 to 423 have been introduced before the input into the set of the "AND" gates 416. Thus, the adder 421 receives, on one of its inputs, the parallel outputs 405 and series output 406 corresponding to the bit No. 54, if this bit has the value 1. If the leading edge of the pulse representing the bit 54 is really at 61 μs from the first pulse of the preamble, this bit 54 may be located, allowing for the tolerances and the jitter in the sampling, at the outputs of the compartments 1219 and 1223. The other input receives the parallel outputs 407 and the series output 408 of the gates 1224 to 1229 where the rising edge of the pulse should be if the bit 54 has the value 0. In the same way, the adders 422 and 423 receive the outputs (405, 407) corresponding to the pulses 55 and 56.

Finally, by means of adders 424 to 426, a last set of AND gates 440 receives the groups of outputs 409, 411 of the compartments 1279 to 1283 and 1289 to 1293, 1299 to 1303 and 1309 to 1313, 1319 to 1323 and 1329 to 1333, of the register 401. These outputs correspond to the first pulses of a long S mode response. The adders 422 to 426 have the same role as the adders 421 to 423 but fulfil this role for the bits 57 to 59 of the S mode response.

The following processing operation will consist in making a search for all the pulses liable to belong to the S mode response that has just been detected. This search will be made according to three cumulative criteria; a criterion of position in time of the pulse with respect to the position of the pulses constituting the preamble, a criterion of power of the pulse in relation to the mean power of the pulses of the response, a criterion related to the angular divergence of the pulse in relation with the mean value of the angular divergence of the pulses of the response. The mean reference values of angular divergence and power are measured in the case of the embodiment on the mean value of the four pulses forming the preamble of the detected S mode response. The mean value of a pulse is obtained by taking the mean value of the samples that constitute it. Each pulse meeting the temporal criterion is then compared, from the viewpoint of its power and its angular divergence, with the mean reference values established on the four pulses of the preamble. If the differences observed are below a threshold fixed in advance, then the pulse is considered to form part of an S mode response.

The value of the threshold in relation to the power is itself a function of the mean value of the four pulses used as a reference. In the embodiment according to the invention, the threshold value is variable according to four steps. The value of the steps and of the thresholds is programmable. The lower the value of the mean reference power, the higher are the thresholds.

The criterion of angular divergence is no longer taken into account when the value of the mean reference power is below a fixed threshold.

The selection of the pulses that belong or do not belong to the detected S mode response shall now be explained with reference again to FIG. 3.

It has been seen, at the start of the description with reference to FIG. 3, that the module 300 processes the information elements $Log\Sigma$, $\Delta/\Sigma$, $Q\Sigma$ and QRSLS (quantized receiver side lobe suppression) to detect the pulse leading edges LE. This module also elaborates a pulse message. This message is renewed regularly at the sampling rate. This message comprises inter alia the following magnitudes, on dedicated channels, in addition to the magnitude called LE which indicates the position of a pulse leading edge when it is at 1:

a magnitude called $Log\Sigma Sum$ obtained by taking the sum of the value of the successive samples $Log\Sigma$. This sum is reset at zero whenever LE goes to 1. Thus, the previously obtained value is the sum of the value of the samples $Log\Sigma$ assigned to the previous pulse;

a magnitude called $\Delta/\Sigma Sum$ computed in the same way as $Log\Sigma Sum$;

a magnitude called SVF (significant value flag) that can take the values 0 or 1. This magnitude is at the value 1 if it has not been possible to associate samples, enabling the computation of the values for $Log\Sigma$ and $\Delta/\Sigma$, with a detected pulse leading edge;

a magnitude called NumSam representing the number of samples that have been used to establish the values $Log\Sigma Sum$ or $\Delta/\Sigma Sum$;

The magnitudes $Log\Sigma sum$, $\Delta/\Sigma sum$ and numsam at output of the module 300 are introduced into a module 510 which associates the value of the power and of the angular divergence of the pulse with each LE. This value is obtained by division of $Log\Sigma sum$ and $\Delta/\Sigma sum$ by numsam. It can be seen that this value is the mean value of the samples representing the pulse as regards the power and the angular divergence. These values are then stored in a circular memory 610 at the sampling rate. Each memory compartment of the memory 610 therefore contains either an information element in the form of a word with three components representing the mean value of $Log\Sigma$, $\Delta/\Sigma$ and SVF or no information element. The compartments containing an information element have, between them, the same intervals as the pulse messages containing an information element LE at the value 1.

The function of this circular memory is to delay the information relating to each pulse during the time necessary for the detection of an S mode response, increased by the time needed to establish the mean value of the magnitudes characterizing the pulses that compose the response.

This latter part of the processing shall be dealt with here below. This processing is done on data elements relating to each pulse. These data elements are stored in a circular memory 520.

The address of the data elements pertaining to a pulse of the circular memory 520 is a function of the moment when the leading edge LE of this pulse has been detected. The information elements of the circular memory 520 are stored in this memory in the same way as the information elements of the memory 610. This means, especially, that the memory compartments whose address corresponds to an instant where the signal LE has the value 0 are empty. The function of the circular memory 520 is to store the information elements pertaining to each pulse during the time needed for the detection of an S mode response. This storage time is slightly shorter than the storage time of the memory 610. The compartments of the memory 520 that are not empty contain information elements on the values of power and angular divergence of each pulse. They also contain an information element on a bit called SVF whose meaning has been given further above. The information elements on angular divergence and power come from the module 510. The signal SVF is taken directly at output of the module 300 (FIG. 3). It shall be seen further below that the information elements of the memories 610 and 520 are supplied to a computation module. Since the storage concerns essentially the same information elements with a slight shift, it can be seen that that it is quite possible, without departing from the framework of the present invention, to conceive of another arrangement of these memories. The reason why this arrangement has been chosen is related purely to considerations of ease and certainty of addressing the memory compartments as explained hereinafter. The memories 520 and 610 are addressed sequentially by a module 560.

The addressing function is a dual function. There is a first storage addressing. This addressing, as explained further above, is done sequentially at the sampling rate, with an incrementation of the number of the address at each clock signal. This addressing is not shown in FIG. 5. There is a second addressing function consisting, for the processing, in searching for the addresses of pulses which, by virtue of their positions, are liable to belong to an S mode response. It is this second function which has been assigned to the modules 560. The module 560 is a sequencer. It receives from the module 400, at the general sampling rate, two signals on a bit. One signal, called the S mode response detection signal (DRMS) is at 1 if an S mode response is detected. The other signal, called a long S mode response detection signal (DRMSL) is at 1 if the detected response is long, and if not it is at zero.

The reception of these signals triggers the programming of the sequencer 560. If DRMS is at 1 and DRMSL is at 0, the sequencer is programmed for 66 μs. If DRMS is at 1 and DRMSL is at 1 too, then the sequencer is programmed for 122 μs. Upon receiving the signal DRMS, the address computation device 560 makes a computation, on the basis of the current address (the last storage address) of the possible addresses of each pulse of the detected response. These addresses result firstly from their position as standardized and, secondly, from the possible shift owing to the tolerances and jitter introduced by the sampling.

Under these conditions, each pulse may have five addresses corresponding to five consecutive memory compartments. Given the way in which the detection is done (see further above), the address of the first pulse of the preamble corresponds to the memory compartment loaded 66.7 μs earlier.

Throughout the duration of the processing, the sequencer 560 counts the clock beats so as to be able, when necessary, to determine the address of the pulses of the detected response on the basis of the current address. With the problem of addressing resolved, the processing in itself is relatively simple. It consists in a computation of the mean reference value of the magnitudes $Log\Sigma$ and $\Delta/\Sigma$ established on the pulses of the preamble. This computation is done in a module 540 which receives the values of these magnitudes coming from the compartments, addressed by the modules 560, of the memory 520.

The mean reference values computed by the module 540 are introduced into a comparison module 620 by a first series of inputs 621. A second series of inputs 622 of this module receives the values $\overline{Log\Sigma sum}$ and $\overline{\Delta/\Sigma sum}$ coming from the memory compartments of the memory 610. The pulse is considered to belong to the S mode response if the differences between the mean reference value of each magnitude and the value of the current pulse are smaller than a threshold that is programmed as a function of the value of $Log\ \Sigma sum$. When $\overline{Log\Sigma sum}$ is below a fixed value, the comparison on $\Delta/\Sigma$ is no longer carried out.

Figure 5:
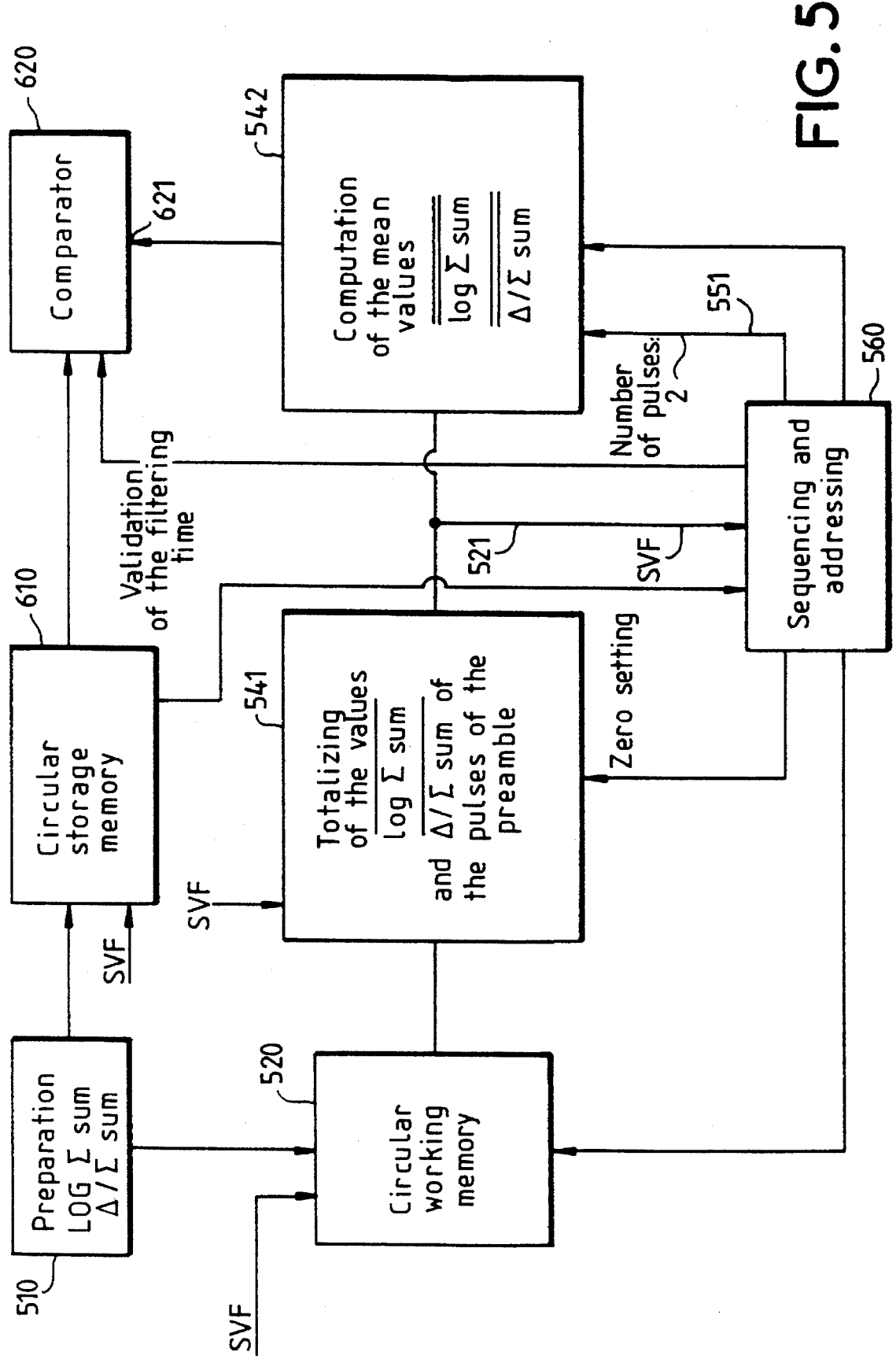
FIG. 5 shows a preferred embodiment of a module.

The preferred embodiment of the module 540 shall now be described with reference to FIG. 5.

This module is formed by two modules 541 and 542.

This module 541 carries out a simple addition of the magnitudes $\overline{Log\Sigma sum}$ and $\overline{\Delta/\Sigma sum}$ of the pulses of the preamble. When the signal SVF of a pulse is at 1, the pulse is not taken into account and the sequencer 560 is informed thereof by a link 521. This places a counter of the sequencer on hold. The information, namely the number of pulses counted, is given to the module 542 by a link 551 coming from the sequencer 560.

The module 542 receives the sums at output of the module 541. A division by the number of pulses gives a mean reference value of the magnitudes $Log\Sigma sum$ and $\Delta/\Sigma sum$ obtained on the pulses of the preamble assigned a signal SVF at 0.

Figure 6:
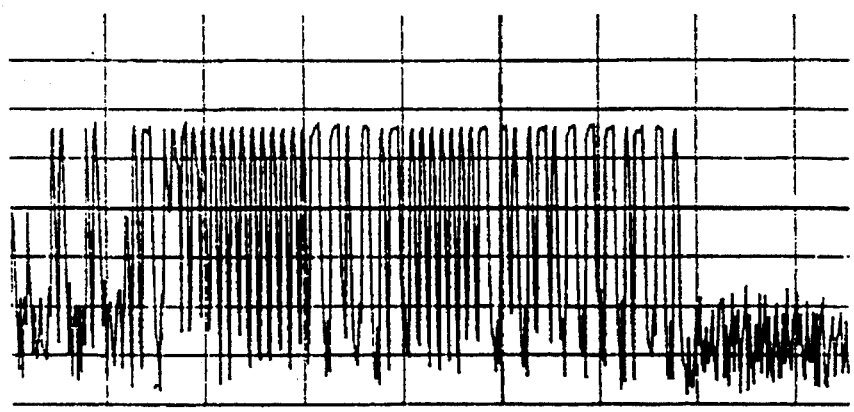
FIGS. 6 and 7 illustrate the results of the filtering.
Figure 6:
Figure 6:
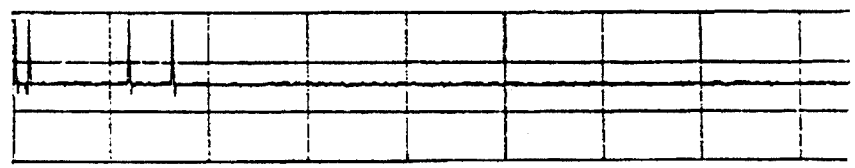
Figure 7:
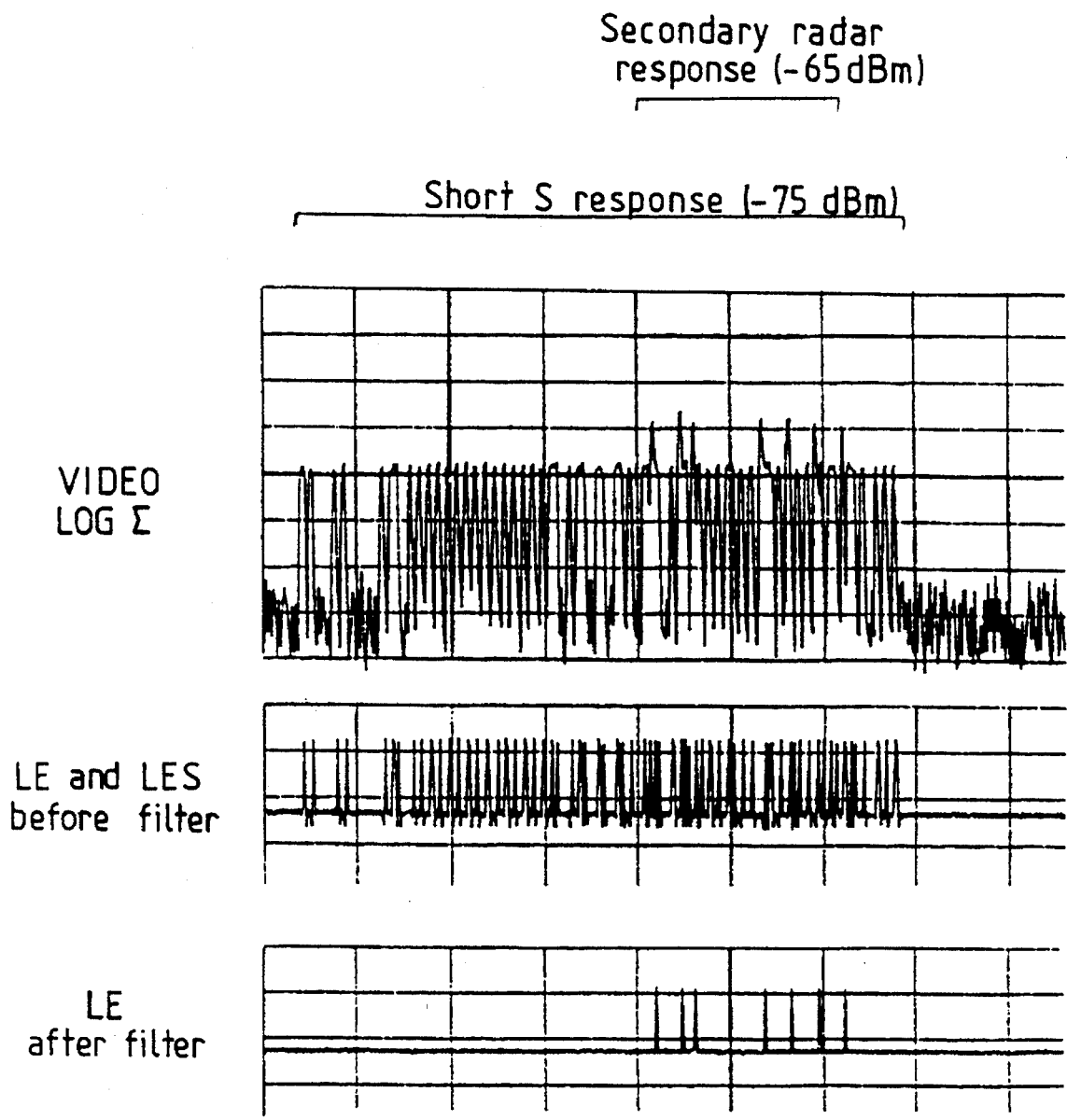

FIGS. 6 and 7 each illustrate the results obtained by the filtering in three phases. In FIG. 6, the top curve represents a video signal $Log\Sigma$ in which there are mixed a secondary radar response with a power level of −77 dBm and a short S mode response with a power level of −60 dBm. The central curve represents the signals LE before filtering by the device according to the invention. The bottom curve represents the signals LE of the leading edges of a secondary radar response extracted by the processing operation. FIG. 7 shows the same three phases, but for a more powerful secondary radar response (−65 dBm) than the S response with which it is mixed (−75 dBm). This fact is expressed in the video curve $Log\Sigma$ by peaks that go beyond the mean level of the curve.

It is observed that, in both cases, the device according to the invention enables the extraction of the desired pulses.

What is claimed is:

1. A digital method for the real-time detection of pulse messages constituted according to a standard defining the widths and relative positions of the different pulses constituting the message, the standard stipulating that the message may be short, in which case it comprises a number (A+B) of pulses, or long in which case it comprises (A+B+C) pulses, wherein:

1) signals representing the presence or absence of a pulse leading edge are memorized in sequence at intervals corresponding to a period P, for a number of periods P that is sufficient to memorize at least (A+B+1) pulses of the message, each leading edge having, at each instant, an address in the memory as a function of its instant of arrival;

2) a check is made to verify the simultaneous presence of a first group of pulses which, by virtue of the relative time differences of their addresses, are liable to belong to the (A+B) first pulses memorized, this simultaneous presence leading to the production of a first signal having the value (1) in the event of presence and the value (0) in the event of absence and simultaneously a check is made to verify the simultaneous presence of a second group of pulses which, by virtue of the relative time differences of their addresses, are liable to belong to pulses of the message, memorized after the (A+B) first pulses, this presence leading to the production of a second signal having the value (1) in the event of presence and the value (0) in the event of absence, the first signal at (1) constituting a message detection, the second signal at (0) or (1) characterizing a short or long message.

2. A method according to claim 1, applicable to a message for which the standard stipulates that the (A) first pulses, which are preamble pulses, have invariable positions with respect to one another, wherein the first group of pulses is constituted by the (A) first pulses and the last consecutive pulses of the (B) following pulses, and wherein the second group of pulses is constituted by the first consecutive pulses following the (A+B) first pulses.

3. A method according to claim 2, applicable to s message constituted by an S mode response for which (A=4, B=56 and C=56), wherein the first group of pulses is constituted by the four pulses of the preamble and
  pulses of the group B, and wherein the second group is constituted by the first three pulses following the 56th pulse of the group B.

4. A digital method for the recognition of pulses liable, by virtue of their temporal positions, to belong to a pulse message constituted according to a standard that defines the widths and relative positions of the different pulses constituting the message, the standard stipulating that the message may be short, in which case it comprises (A+B) pulses, or long in which case it comprises (A+B+C) pulses, said method consisting in:
  a) memorizing, in sequence at intervals corresponding to a period P, for at least one of magnitudes $\alpha$, $\beta$, $\gamma$, values measured beforehand on each pulse, each value having, at each instant, an address in the memory as a function of its instant of arrival;
  b) detecting, in sequence at the same instants and at intervals corresponding to the same period P, the presence of a message, the detection being made so as to occur, by construction, in a time that is known in relation to the first pulse of the detected message, each detection prompting the passing to 1 of a first signal initially at 0 and the passing to 1 of a second signal, initially at 0, if the response is long;
  c) upon the receiving of a value 1 for the first signal and of the value of the second signal, the establishing on several values of the magnitudes $\alpha$, $\beta$, $\gamma$ respectively, stored in memories which, by virtue of their addresses, have relative positions corresponding to pulses of the message detected at the step b, of mean reference values $\alpha$, $\beta$, $\gamma$ of the different magnitudes;
  d) determining the address of the value of at least one of the magnitudes $\alpha$, $\beta$, $\gamma$ which, by virtue of its position with respect to the moment of the detection, is the address of the value $\alpha$, $\beta$, $\gamma$ of the first pulse;
  e) comparing the value of at least one magnitude $\alpha$ or $\beta$ or $\gamma$, with the corresponding mean value $\overline{\alpha}$ or $\overline{\beta}$ or $\overline{\gamma}$;
  f) recognizing the first pulse as belonging to the message if none of the comparisons shows a divergence, between its value and the corresponding mean reference value, that is greater than a previously fixed threshold for each magnitude;
  g) recommencing the steps d, e, f for each of the following pulses which, by virtue of their positions, are liable to belong to the detected response, during the time corresponding to a short message if the second signal has the value 0 and the time corresponding to a long message if the second signal has the value 1.

5. A digital method according to claim 4, wherein the threshold of comparison of one of the magnitudes may be a function of the mean value of another magnitude.

6. A digital method according to claim 4, wherein the measured magnitudes include a magnitude Log$\Sigma$ representing the power of the received signal and an angular magnitude $\Delta/\Sigma$ representing a divergence between the point of origin of the received signal and a directional reference.

7. A method according to claim 4, wherein the detection is made according to claim 1.

8. A use of the method according to claim 4, for the detection of a message constituted by an S mode response.

9. A device for the real-time detection of the pulses belonging to a microwave message constituted according to a standard stipulating that the message may be randomly short or long, and that comprises:
  a preamble constituted by a number A of pulses, for which the widths and relative positions as well as the tolerances of divergence are fixed by the standard;
  a block of data elements constituted by pulses modulated in position, for which the widths and the possible positions, given the modulation and the tolerances, are fixed by the standard, the standard stipulating that each block of data elements may be randomly constituted by B pulses, in which case the message is said to be short, or (B+C) pulses in which case the message is said to be long, the device being included in a receiver of microwave signals provided with means to elaborate a digital signal LE representing the presence of a pulse leading edge, means to elaborate other magnitudes relating to the microwave signals received by the receiver, and means to convert these magnitudes into digital signals, the digitization being done by a periodic sampling of values of these magnitudes, wherein the sampling is controlled by clock signals simultaneously for the signals LE and for the other magnitudes, the period having the value P, and wherein the signals at output of the means preparing the signals LE are introduced in sequence, upon command by the same clock signals, into a shift register with series input and parallel outputs, comprising a number of compartments that is not smaller than the number of periods P between the leading edge of the first pulse of the preamble and the leading edge of the first pulse of the C pulses characterizing a long response and wherein first groups of outputs of consecutive compartments of this register are connected in parallel to supply series links which supply a first correlator, second groups of outputs of consecutive compartments of this register are connected in parallel to supply series links which themselves supply summators, each summator output supplying the first correlator, and wherein third groups of outputs of consecutive compartments of this register are connected in parallel to supply series links which themselves supply summators, each summator output supplying a second correlator, and wherein the first and second correlators each deliver a positive signal only upon the presence of a signal at each of their supplies.

10. A device according to claim 9, wherein the first groups of outputs are those of the compartments that can occupy the A pulses of the preamble, the second groups of outputs are those of the compartments that can occupy the last b pulses of the group of B pulses and the third groups of outputs are those of the compartments corresponding to the first c pulses of the group of C pulses.

11. A device according to claim 10, wherein the numbers b and c are equal to 3.

12. A use of the device according to claim 9 for the detection of S mode responses, the standard of the responses being defined by the International Civil Aviation Organization for which A=4, B=56 and C=56.

13. A device for the real-time recognition of the pulses belonging to a microwave message that is constituted according to a standard stipulating that the message may be randomly short or long and that comprises a preamble constituted by a number A of pulses, for which the widths and relative positions as well as their divergence tolerances are fixed by the standard, a block of data elements constituted by pulses modulated in position, for which the widths and the possible positions, given the modulation and the tolerances, are fixed by the standard, the standard stipulating that each block of data elements may be randomly constituted by B pulses, in which case the message is said to be short, or (B+C) pulses in which case the message is said to be long, the device being included in a receiver of microwave signals provided with means to elaborate a digital signal which is a pulse message, this message being established on the basis of digital samples, taken at intervals corresponding to a period P, of magnitudes $\alpha$, $\beta$, $\gamma$ characterizing the video signals received by the receiver, the pulse message comprising an information element pertaining to the detection of a pulse leading edge, LE, information elements "sum", representing the sum of the values of the samples of each magnitude $\alpha$, $\beta$, $\gamma$, assigned to the pulse represented by the leading edge LE, an information element "numsam" relating to the number of samples of each magnitude assigned to the pulse represented by the leading edge LE, wherein the device has means to detect the arrival of the message, said means receiving, in sequence, the information elements LE and delivering a signal MSR if a message is detected and a signal LMSR if the detected message is long, a means to compute the mean value sum of each magnitude sum, this means receiving the magnitudes sum and the magnitude numsam of the pulse message, a first addressable circular storage memory, a second addressable circular storage memory which is a working memory, each receiving, in sequence, the values of the magnitudes sum, the address of each magnitude being, at each instant, a function of its instant of arrival in the memory, a means for computing memory addresses and for sequencing, which on receiving the signals MSR and LMSR, determines sum value addresses of at least one magnitude $\alpha$, $\beta$, o, the selected values being supplied in sequence, from the working memory, to a means for the computing of a mean value sum of each selected magnitude, this computing means itself supplying a first series of inputs of a comparison element which, at a second series of inputs and in sequence, receives, from the storage memory and after the end of computation of the mean reference values sum, each of the values of the selected magnitudes $\alpha$, $\beta$, $\gamma$ which, by virtue of their addresses, are liable to belong to the detected response, the comparator holding back, as a pulse belonging to the detected response, the pulses for which the the difference between a value of magnitude measured on this pulse and the mean reference value is below a predetermined threshold for each of the selected magnitudes.

14. A device according to claim 13, for which the pulse message further comprises an information element SVF for the validation of the parameters of each pulse, this information element being stored in the working memory and the storage memory, wherein the means for the computation of the mean reference value comprise a summation device receiving, from the circular working memory, values Log$\Sigma$sum and $\Delta/\Sigma$sum of the pulses of the preamble when the signal SVF validates them and transmitting the signal SVF to the sequencing and addressing means, and a divider means receiving the total of the values Log$\Sigma$sum and $\Delta/\Sigma$sum of the pulses of the preamble when the signal SVF validate them and transmitting the signal SVF to the sequencing and addressing means, and a divider means receiving the total of the values Log$\Sigma$sum and $\Delta/\Sigma$sum prepared by the summation device, the number of pulses having formed this prepared sum beeing established by the sequencing means on the basis of the signal SVF.

15. A device according to claim 13, wherein the detector is a detection device according to claim 9.

16. A use of the device according to claim 13, in a secondary radar extractor for the filtering of S mode responses, the magnitudes characterizing the video signals being a magnitude representing the power of the pulse Log$\Sigma$ and a magnitude that represents an angular divergence $\Delta/\Sigma$.

* * * * *